United States Patent
Sheldon

[11] 3,874,220
[45] Apr. 1, 1975

[54] LOW PRESSURE DEW AND FROST POINT INDICATOR

[75] Inventor: Robert S. Sheldon, Northridge, Calif.

[73] Assignee: Air-Dry Corporation of America, Northridge, Calif.

[22] Filed: Jan. 26, 1973

[21] Appl. No.: 326,979

[52] U.S. Cl. .............................................. 73/17 A
[51] Int. Cl. ..................... G01n 25/02, G01n 25/66
[58] Field of Search .......................... 73/17 A; 62/5

[56] References Cited
UNITED STATES PATENTS

| | | | |
|---|---|---|---|
| 2,763,150 | 9/1956 | O'Bannon | 73/17 |
| 3,083,565 | 4/1963 | Jennings et al. | 73/17 |
| 3,374,658 | 3/1968 | Ford | 73/17 |
| 3,460,373 | 8/1969 | Ford | 73/17 |
| 3,589,168 | 6/1971 | Hankison | 73/17 |

*Primary Examiner*—Herbert Goldstein
*Attorney, Agent, or Firm*—Robert C. Comstock

[57] ABSTRACT

A low pressure dew and frost point indicator for measuring the amount of water vapor in a gas stream. The device utilizes the gas sample at full input pressure and operates on power derived from the gas pressure without any external power source and with no moving parts. The sample stream is fed into the generator of a vortex tube and the cold air output of the vortex tube is directed against the back of a mirror. Clouding of the mirror indicates the dew or frost point. The cold air output from the vortex tube may also be used to pre-cool the sample stream. It may then be combined with the hot air output of the vortex tube in a venturi tube outlet to increase the pressure ratio between the vortex tube inlet and cold air outlet and thereby lower the cold air output temperature.

2 Claims, 4 Drawing Figures

3,874,220

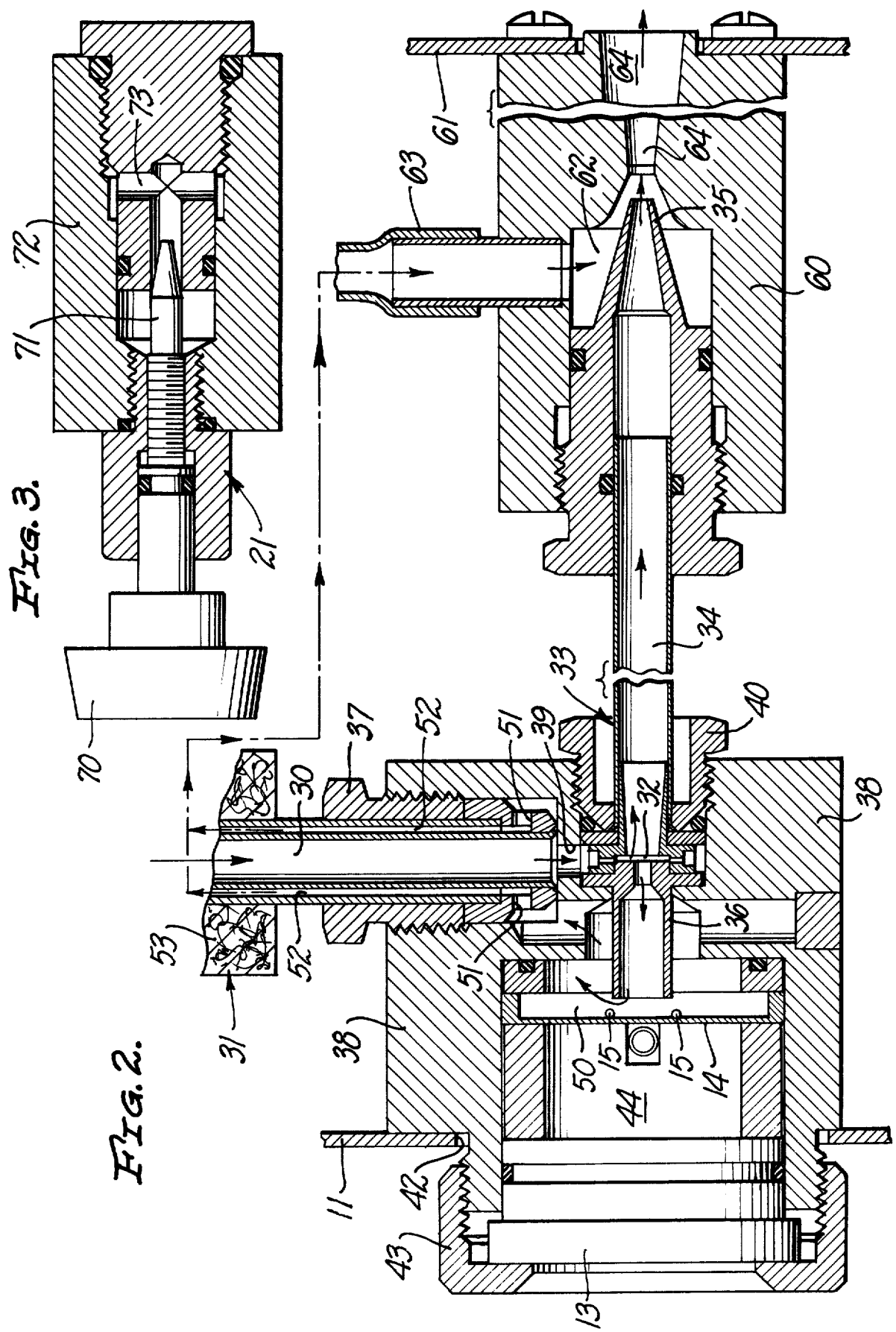

LOW PRESSURE DEW AND FROST POINT INDICATOR

BACKGROUND OF THE INVENTION

1. Field of the Invention

The invention relates to a low pressure dew and frost point indicator for measuring the amount of water vapor which is present in gases or gaseous mixtures.

Unwanted moisture has always plagued science and industry. It interferes with quality control, reduces efficiency of chemical processes, fouls delicate instruments and controls, reduces efficiency of air-operated tools and equipment, attenuates the power output of radar systems and freezes valves and equipment in cold environments.

2. Description of the Prior Art

Dew and frost point indicators which are now in use for measuring the mixture of the content of gas streams customarily require reduction of the sample stream to atmospheric pressure. This requires means for accomplishing such pressure reduction and it also makes it necessary to use conversion tables in order to convert the reading to make it applicable to the pressure involved prior to reduction.

The devices now in use also customarily require external power sources and/or an external source of refrigeration. Some are relatively complex and expensive electronic instruments which require skilled personnel to operate them and which require extensive maintenance.

SUMMARY OF THE INVENTION

The present invention provides a practical and accurate measurement of the amount of water vapor which is present in gases and gaseous mixtures.

It is among the objects of the present invention to provide a device of the class described which is an improvement over the prior art for the following reasons. No external power source is required, since the device operates on power derived from the pressure of the stream being tested. No external source of refrigeration is required, the desired refrigerating action also being derived from the stream being tested. There are no moving parts wihin the device. The dew and frost point of the gas sample can be obtained at full pressure, with no reduction of the sample to atmospheric pressure being required.

The device utilizes a vortex tube to divide the stream into a hot fraction and a cold fraction. The cold fraction is impinged upon a mirror with frosting of the front of the mirror indicating the dew or frost point. The dew or frost point temperature is read directly from the indicator at the time precipitation is first observed on the face of the mirror. This reading indicates the amount of moisture which is present in the sample stream.

The cold fraction of the stream after impingement on the mirror is utilized to pre-cool the incoming stream, thus making possible lower temperatures of the cold fraction.

The cold fraction thereafter is utilized together with the hot fraction in a venturi outlet to increase the absolute pressure ratio and thus further lower the temperature of the cold fraction.

The simplicity of the structure and operation of the present invention make it possible for the device to be manufactured and operated at lower cost, with less skilled personnel and with accurate results which are read directly from the instrument.

It is accordingly among the objects of the invention to provide a dew or frost point indicator having all of the advantages and benefits of the structure set forth above and described in detail hereinafter in this specification.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 2 is a longitudinal sectional view of the indicator taken on line 2—2 of FIG. 1, with portions broken away to shorten the length;

FIG. 3 is a sectional view of the flow control valve taken on line 3—3 of FIG. 1;

DESCRIPTION OF THE PREFERRED EMBODIMENT

Figure 1:
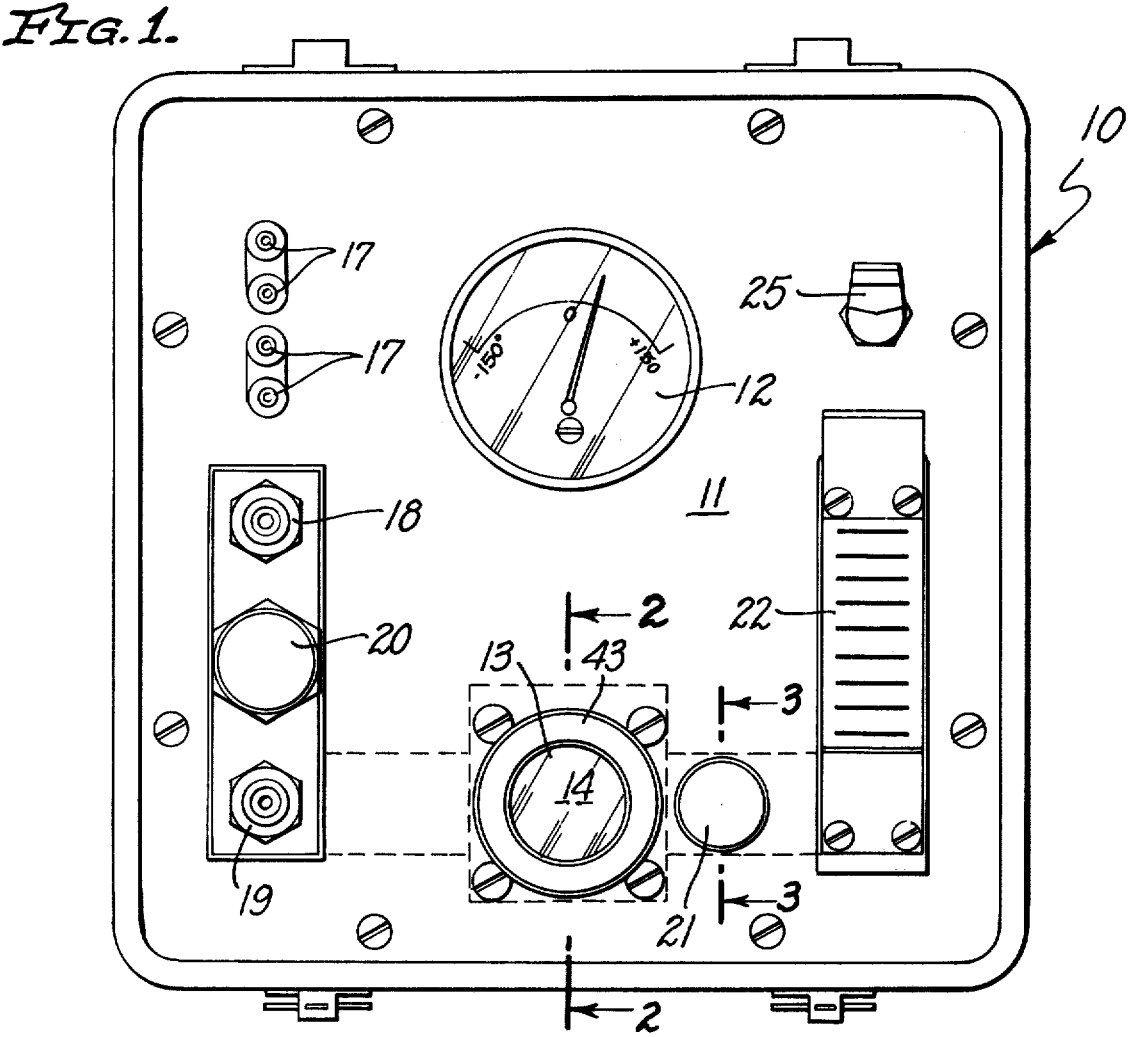
FIG. 1 is an elevational view of the frost point indicator case.
Figure 4:
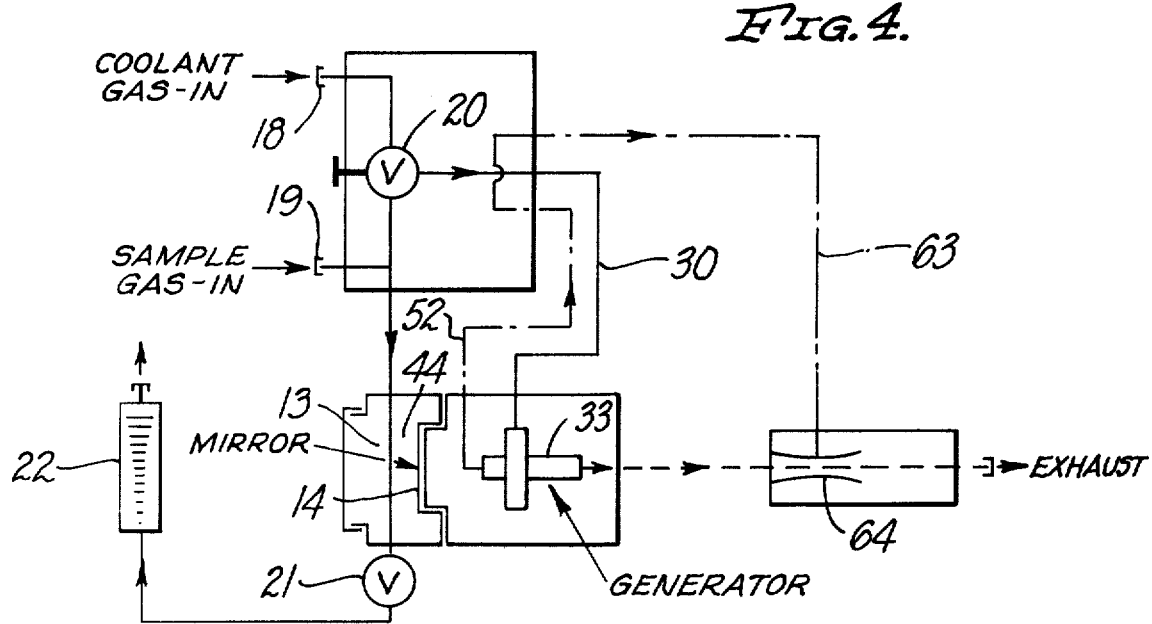
FIG. 4 is a schematic view of the indicator and the flow of gas through the indicator.

The device is enclosed within a case 10 having a front control panel 11, which is shown in FIG. 1 of the drawings. In the top center of the control panel 11 is an indicator dial 12 which covers temperatures from minus 150°F. to plus 150°F. Through a viewing port and lens 13 can be seen the face of a mirror 14 disposed within the case 10 to determine visually when the dew or frost point is reached as indicated by the formation of precipitation on the face of the mirror.

The temperature at which the precipitation first forms is measured and indicated by either of a pair of thermocouples 15 which are attached to the back of the mirror 14. Two thermocouples are provided as a safety feature in case one thermocouple or its circuit should malfunction. The selection of which thermocouple is used is controlled by a manually operated switch 25 disposed in the upper right hand corner of the panel 11.

In the upper left hand corner of the panel 11 are four electrical outlet jacks 17 which may be used to connect the electrical signals from the thermocouples 15 to a recorder for recording the temperatures measured by the thermocouples.

In the lower left hand corner of the panel 11 are a coolant gas inlet 18, a sample gas inlet 19 and a selector valve 20. Normally, the sample gas inlet 19 is used if the sample has sufficient pressure (80 PSIG) for the vortex tube to function properly. If the sample gas pressure is insufficient, compressed air is supplied through the coolant gas inlet 18 directly to the vortex tube and is used instead of the sample gas to provide the pressure necessary for operation of the vortex tube. The selector valve 20 is manually operated to select either inlet 18 or inlet 19. There is no valve controlling the flow to the vortex tube because its generator is designed to be self-limiting.

Beside the viewing port lens 13 is a flow control valve 21 which is manually operated to control the amount of sample gas flowing through the sampling chamber 44 of the device, which is the area disposed in front of the mirror 14. The flow rate is indicated at the right side of the panel 11 on a flowmeter 22 measuring from 1 to 10 SCFH. The flow control valve structure is shown in FIG. 3 of the drawings. It includes a knob 70 which is mounted on the outer end of a valve stem 71. The valve stem 71 is threadedly mounted in a body member 72 and is rotatable to control the amount of sample gas flow through a passage 73. The sample gas flows through the sampling chamber 44, through the flowmeter 22 and is then vented.

Turning now to FIG. 2 of the drawings, this shows on the left the generator portion of the vortex tube and the mirror assembly. Starting at the top of the drawing, the incoming gas from the inlet 18 or 19 enters (flowing downwardly on the drawings) through the center passage 30 of a tube-in-tube type heat exchanger tube 31. The unjacketed end portion of the tube 31 extends through a nut 37 mounted in a body 38. The outlet of the passage 30 extends through an opening 39 in the body 38 into the generator portion 32 of a vortex tube 33. The vortex tube 33 is secured to the body 38 by a retainer nut 40.

The vortex tube 33, which is sometimes referred to as a Ranque-Hilsch tube, is commercially manufactured and sold by Vortec Corporation of 1067 North Bend Road, Cincinnati, Ohio 45224. It is an instrument which is capable of converting a supply of compressed air or gas into two streams, one hot and one cold. This is accomplished without moving parts, using only the pressure of the compressed air as a source of energy.

The compressed air is injected at sonic speed circumferentially into the vortex generating chamber of the generator portion 32. The vortex which is generated there moves through an elongated outlet tube 34 toward a hot air outlet nozzle 35 at its outer end. The outlet nozzle 35 exerts enough pressure on the vortex to force some of the air back out through a cold air outlet tube 36 which is on the opposite side of the vortex generator portion 32 and which is pointed in the opposite direction. This air is much colder than the compressed air or gas entering through the supply tube 30.

The end of the cold air outlet tube 36 is directed forward the back of the previously mentioned mirror 14. The face of the mirror 14 is directed toward the front of the panel 11. The viewing lens 13 is mounted within a portion of the body 38 which projects through an opening 42 in the panel 11. The lens 13 is held by a lens retainer nut 43. A sampling chamber 44 is disposed between the face of the mirror 14 and the back of the lens 13. Moisture is condensed from the sample air flowing through the sampling chamber 44 when the mirror 14 becomes cold.

A cold air chamber 50 is disposed within the body 38 behind the mirror 14 and surrounding the cold air outlet tube 36. The lower end of the retainer nut 40 is provided with openings 51 which connect the cold air chamber 50 to the outer passage 52 of the heat exchanger tube 31. The cold air after impinging upon the back of the mirror 14 flows from the chamber 50 through the openings 51 into the passage 52, where it surrounds the entering air or gas flowing through the center passage 30.

The outside of the passage 52 is surrounded by thick insulation 53 to insulate the cold temperature of the air and causes it to pre-cool the entering air or gas during its movement from the selector valve 20 to the vortex tube 33. The heat exchanger tube 31 is preferably several feet long and is coiled within the case 10 to provide greater length and correspondingly greater cooling of the inlet stream.

The cold air output of the vortex tube is accordingly used in a bootstrap operation to pre-cool the incoming stream and thereby make it possible to achieve lower temperatures in the cold air chamber 50. This arrangement also permits the device to accept incoming air or gas at a higher temperature.

The hot air outlet nozzle 35 of the vortex tube 33 shown on the right side of FIG. 2 extends into the inner end of a second body member 60 which is secured to the back panel 61 of the case 10. This outlet is surrounded by a chamber 62 with which is connected a tube 63 carrying from the selector valve 20 the pre-cool exhaust air from the passage 52 of the heat exchanger tube 31.

The chamber 62 is in turn connected to a venturi tube air ejector 64 which extends through an opening in the back panel 61 to the atmosphere. The purpose of this arrangement is to evacuate the exhaust air from the cold air chamber 50 at sub-atmospheric pressure. The actuating air for this venturi air chamber 64 comes from the hot air outlet nozzle 35 of the vortex tube 33. Assuming the supply of the vortex tube to be at 80 PSI, the pressure at the hot air outlet nozzle 35 will be approximately 20 PSI and this kinetic energy is used to create a vacuum which is communicated to the cold air chamber 50 through the tube 63 and passage 52.

This is done because the temperature drop through the vortex tube 33 is related to the absolute pressure ratio between the inlet and the cold air outlet. If the inlet gas is supplied at 90 PSIG (105 PSIA) and exhausts to atmospheric pressure at 15 PSIA, the absolute ratio is 105/15 or 7/1. If only a small vacuum is pulled from the cold air chamber 50 to reduce its pressure to 10 PSIA, the ratio is increased to more than 10/1 and the temperature drop is accordingly increased.

There is accordingly a second bootstrap operation in which the hot air tube of the vortex tube is used in combination with a venturi tube to decrease the pressure at the cold air outlet and thereby further decrease the temperature of the cold air output of the vortex tube.

Instead of thermocouples, the indicator may be provided with thermistors or other suitable temperature sensing devices, including a digital temperature readout. Such devices may require electrical power for their operation, but the remainder of the indicator would still function entirely on power derived from the pressure of the sample stream.

I claim:

1. In a dew and frost point indicator for measuring the amount of water vapor in a gas stream of the type in which a sample of said gas stream flows past the face of a mirror and which includes means for cooling the back of the mirror, means for observing the moment when precipitation first occurs on the face of the mirror and means for determining the temperature of the mirror when precipitation first forms, said indicator including a vortex tube to cool the back of said mirror, said vortex tube having a generator chamber, a cold air outlet and a hot air outlet, means connecting a stream under pressure to said generator chamber for operation of said vortex tube toward the back of said mirror to cool said mirror and operate said indicator, said gas stream being tested flowing past the face of said mirror without reduction of its input pressure so that said indicator provides a direct reading of moisture content without requiring mathematical conversion for pressure reduction, the improvement comprising regenerative means for continuously using the cold air output from said vortex tube to pre-cool the vortex tube operating stream before it enters said generator chamber to provide lower temperature cold air output from said vortex tube, and means continuously connecting said cold air output from said regenerative means to a venturi tube together with the hot air output of said vortex tube, to reduce the pressure ratio between the hot air and cold air outputs of said vortex tube and thereby provide lower temperature cold air output from said vortex tube.

2. The structure described in claim 1, said regenerating means comprising a tube-in-tube type heat exchanger tube, with the vortex tube operating stream flowing in one direction through the center passage of said tube and said cold air output flowing in the opposite direction through the outer passage of said tube surrounding said center passage.

* * * * *